A. E. NEWTON.
SPINDLE DRIVING MECHANISM.
APPLICATION FILED NOV. 30, 1910.
1,105,529.
Patented July 28, 1914.
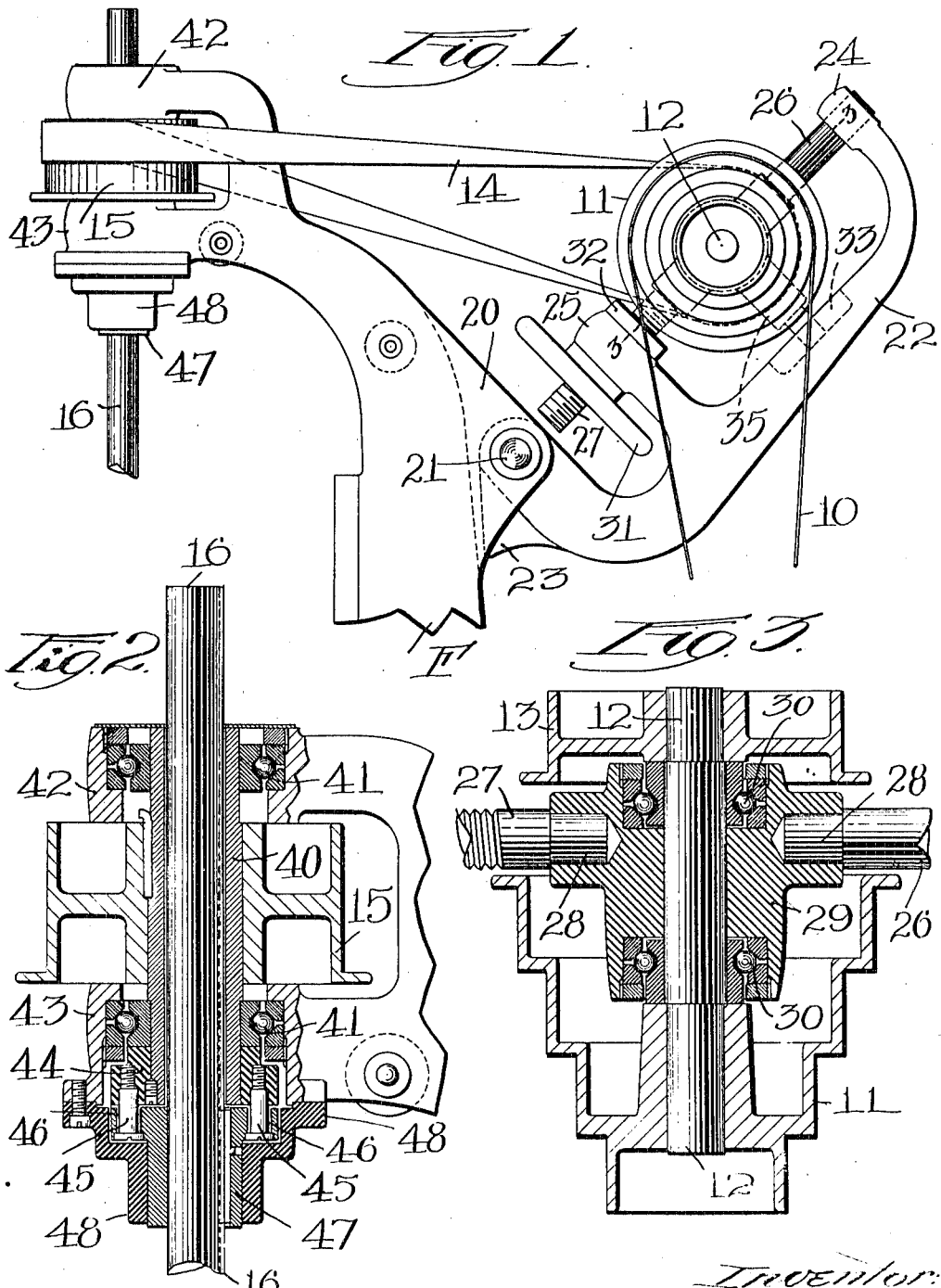

UNITED STATES PATENT OFFICE.

ALBERT E. NEWTON, OF WORCESTER, MASSACHUSETTS, ASSIGNOR, BY MESNE ASSIGNMENTS, TO REED-PRENTICE COMPANY, OF WORCESTER, MASSACHUSETTS, A CORPORATION OF MASSACHUSETTS.

SPINDLE-DRIVING MECHANISM.

1,105,529.  Specification of Letters Patent.  Patented July 28, 1914.

Application filed November 30, 1910. Serial No. 594,863.

*To all whom it may concern:*

Be it known that I, ALBERT E. NEWTON, a citizen of the United States, residing at Worcester, in the county of Worcester and State of Massachusetts, have invented a new and useful Spindle-Driving Mechanism, of which the following is a specification.

This invention relates to a driving mechanism for spindles for upright drills, tapping machines, and other machine tools.

The principal objects of the invention are to provide a simple and effective support for a longitudinally slidable spindle and for the pulley for driving it of such character that the pulley will be supported at both sides and yet of such a character that a lost motion connection can be located below the pulley for connecting the pulley with the spindle to drive the latter; also to provide a simplified construction in which if there is any tendency of the driving belt to twist the pulley that will not be imparted directly to the spindle to bind the latter in the bearings.

Another object of the invention is to provide a simple and convenient means for supporting the connected pulleys between two belts by which power is transmitted to said spindle pulley, and at the same time to provide for convenient adjustment of the same to take up the slack of both belts at the same time.

Further objects and advantages of the invention will appear hereinafter.

Reference is to be had to the accompanying drawings, in which—

Figure 1 is a side elevation of a portion of an upright drill showing one way in which this invention can be applied thereto. Fig. 2 is a central sectional view of the spindle and pulley thereon; and Fig. 3 is a central sectional view of the transmitting pulley.

The invention is shown as applied to a particular machine, but is capable of application to many other kinds of machinery. It is shown herein as applied to mechanism in which a main driving pulley of the cone variety (not illustrated herein) delivers power to a driving belt 10 which passes over a cone pulley 11. This cone pulley is fixed to a shaft 12 to which a pulley 13 is also fixed. This pulley 13 by a belt 14 drives a pulley 15 from which power is transmitted to a spindle 16.

The goose neck or frame of the machine is shown as provided with bosses 20 on which a pivot pin 21 is mounted. On this is pivoted a support 22 having a projection 23 adapted to engage the frame F when the support drops back to constitute a stop therefor. But in ordinary practice this projection is held out of contact with the frame F by the tension of the belt 14. On the support 22 are two arms 24 and 25 having alined passages therethrough for receiving a pair of rods 26 and 27, the latter of which is screw-threaded. These rods are in alinement and are connected at their inner ends so that they virtually constitute a single rod. They are connected by reduced ends 28 which are fixed in sockets in a hub 29. This hub is provided with ball bearings 30 for supporting the shaft 12. On the screw threaded rod 27 is a hand wheel 31 having an internally screw threaded hub extending through the arm 25 and having a collar 32 on the opposite side thereof. The turning of this hand wheel will cause the rod 27 to move longitudinally and thus shift the position of the hub 29 and rod 26. This results in tightening or loosening both belts 10 and 14. To prevent the rotation of the rods 26 and 27 and the hub the latter is provided with a projection 35 entering a longitudinal slot 33 in the frame 22. With this construction it will be seen that the tensions of both belts can be adjusted with great nicety and sufficient rapidity for all ordinary purposes. The tension on the belt 14 will always be greater than that on the belt 10 on account of the weight of the frame 22 which is entirely supported by the belt 14.

The pulley 15 for the spindle 16 is provided with a sleeve 40 extending through the same and projecting from both sides. This sleeve is mounted in ball bearings 41, one set being located on each side, in the present case one above and one below the pulley. The upper set of ball bearings is mounted in a well known way in a hub 42 on the frame, the lower set is also mounted in a hub or enlargement 43. These two hubs are integral with the frame and have a space between them for the pulley. This sleeve is fixed to the pulley but not to the spindle 16. To the sleeve is fixed a driving collar 44 which therefore rotates with the pulley. This driving collar is provided with one or more headed screws 45 which have a loose fit in passages 46 in a collar 47 which is keyed to the spindle in such a way that the spindle will always be driven from it, although the spindle is vertically movable in it.

In order to keep out dust and dirt, catch the oil from the bearings, and also to properly center the collar 47, a cap 48 is provided fixed on the bottom of the hub 43 and having a cavity therein for the enlargement of the collar 47 and for the small portion thereof. In this way the pulley 45 is supported on both sides at a distance from its center by the bearings. Thus a firm and practicable support is provided and any tendency of this pulley to turn or twist on its bearings is not imparted directly to the spindle to cause the same to bind in the collar 47 because of the loose connection between the screws 45 and this collar. Therefore the parts can adjust themselves to the ordinary conditions existing in a machine of this character and especially to the wear to which the bearing surfaces are subjected. Moreover the connection between the sleeve and spindle is located below the pulley and therefore closer to the work than it would be if located above the pulley.

While I have illustrated and described a preferred embodiment of the invention I am aware that many modifications can be made therein by any person skilled in the art without departing from the scope of the invention as expressed in the claims. Therefore I do not wish to be limited to all the details of construction herein shown and described, but What I do claim is:—

1. In a device of the character described, the combination of a pulley, a sleeve fixed thereto and extending beyond the ends thereof, bearings for said sleeve beyond the ends of the pulley, a driving collar rotatable with the pulley, a second collar, a loose connection between the two collars, and a spindle keyed to the second collar and passing through the sleeve.

2. In a device of the character described, the combination of a pulley, a sleeve therein, a spindle passing freely through the sleeve, bearings for the spindle beyond the ends thereof, a collar rotatable with the pulley and located below the same and beyond the bearings thereof, a second collar to which the spindle is splined, and a loose connection between the two collars.

3. In a device of the character described, the combination of a frame having two hubs in vertical alinement with a space between them, a sleeve passing across said space, bearings in the two hubs for the sleeve, a pulley fixed to the sleeve and located between the two hubs, a driving collar fixed to said sleeve, headed screws projecting from the collar, a second collar through which said screws loosely pass, and a spindle passing through the sleeve and through both collars and keyed to the second collar, said spindle being movable longitudinally therein.

4. In a device of the character described, the combination of a frame having two hubs in vertical alinement with a space between them, a sleeve passing across said space, bearings in the two hubs for the sleeve, a pulley fixed to the sleeve and located between the two hubs, a driving collar fixed to said sleeve, headed screws projecting from the collar, a second collar through which said screws loosely pass, a spindle passing through the sleeve and through both collars and keyed to the second collar, said spindle being movable longitudinally, one of said collars being located in one of said hubs and the other projecting from it, and a cap on the end of the latter hub in which said other collar is located.

5. In a device of the character described, the combination of a frame having two hubs in vertical alinement with a space between them, a sleeve passing across said space, bearings in the two hubs for the sleeve, a pulley fixed to the sleeve and located between the two hubs, a driving collar fixed to said sleeve below the pulley and below the lower bearing, headed screws projecting downwardly from the bottom of said collar, a second collar through which said screws loosely pass, a spindle passing through the sleeve and through both collars and keyed to the second collar, said spindle being movable longitudinally thereon, and a cap on the bottom of the lower hub fitting the lower collar.

6. In a machine of the character described, the combination of a frame having a pair of hubs separated from each other and located one above the other, a pulley located between said hubs, a vertical sleeve to which the pulley is fixed, bearings for the sleeve in the hubs beyond the ends of the pulley, a spindle fitting loosely in, and supported solely by the sleeve and movable axially therein, and a lost motion connection between the bottom of the sleeve and the spindle for driving the spindle in all positions thereof.

In testimony whereof I have hereunto set my hand, in the presence of two subscribing witnesses.

ALBERT E. NEWTON.

Witnesses:
ALBERT E. FAY,
C. FORREST WESSON.